Figure 1:
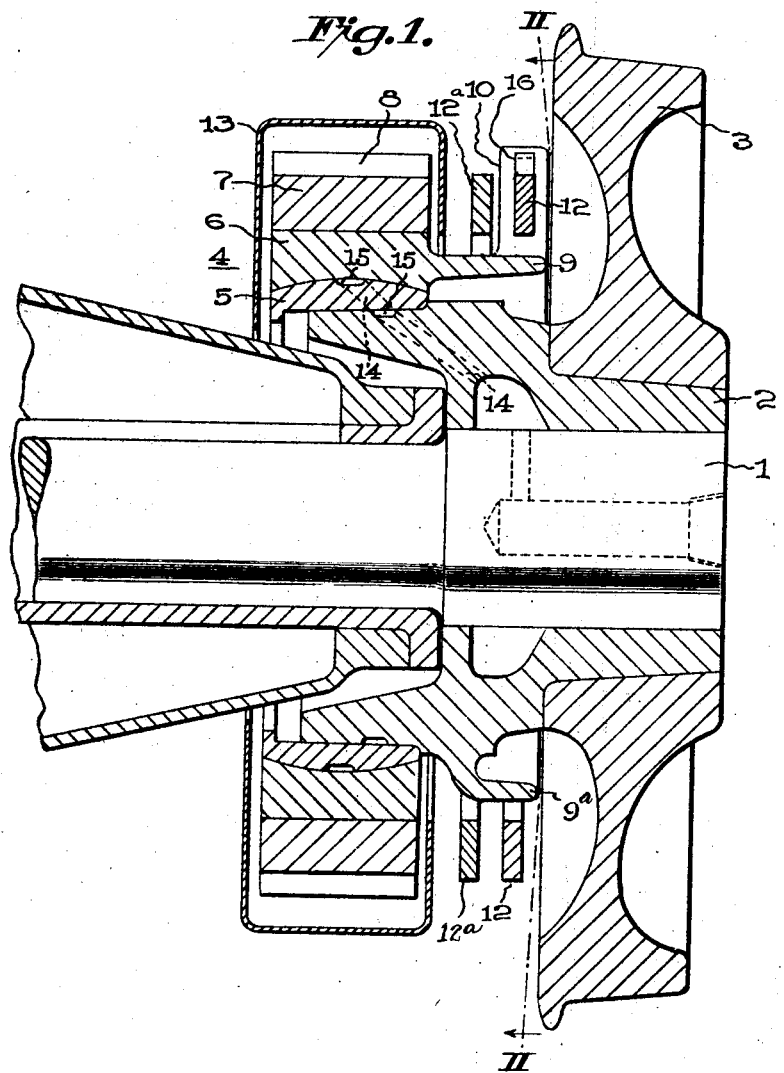

March 19, 1929.   C. BETHEL   1,705,709
FLEXIBLE GEAR WHEEL
Filed Sept. 13, 1924   3 Sheets-Sheet 1

WITNESSES:
R. S. Harrison
M. B. Jaspert

INVENTOR
Claude Bethel
BY
ATTORNEY

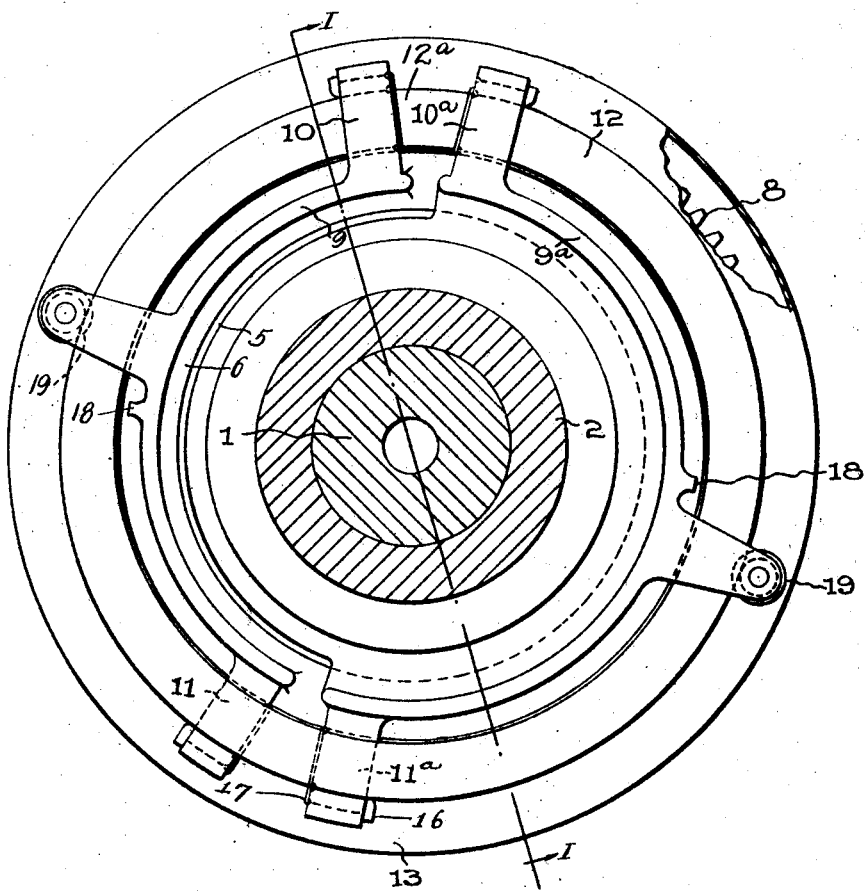

March 19, 1929. C. BETHEL 1,705,709
FLEXIBLE GEAR WHEEL
Filed Sept. 13, 1924 3 Sheets-Sheet 3
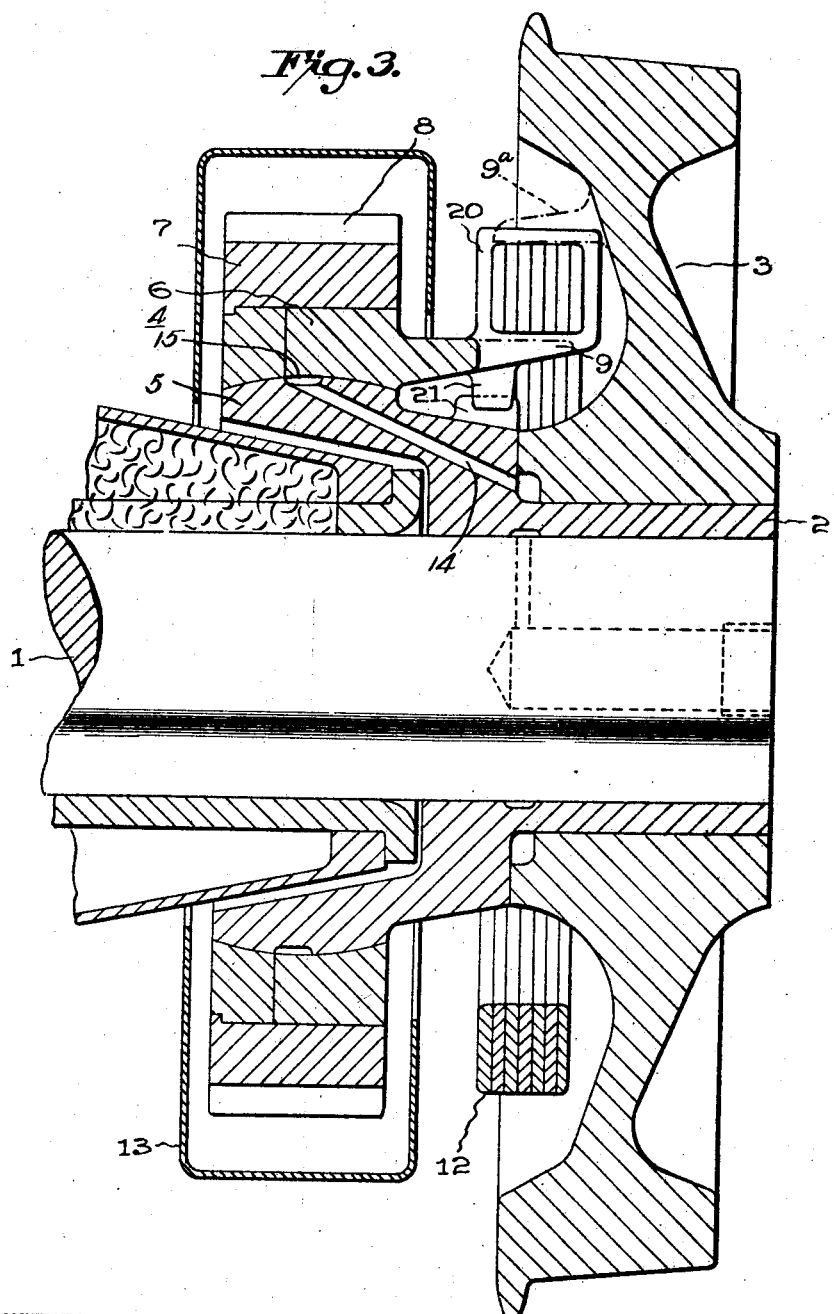
WITNESSES:
R. S. Harrison
W. B. Jaspert
INVENTOR
Claude Bethel
BY
Wesley S. Carr
ATTORNEY Patented Mar. 19, 1929.

1,705,709

UNITED STATES PATENT OFFICE.

CLAUDE BETHEL, OF WILKINSBURG, PENNSYLVANIA, ASSIGNOR TO WESTINGHOUSE ELECTRIC & MANUFACTURING COMPANY, A CORPORATION OF PENNSYLVANIA.

FLEXIBLE GEAR WHEEL.

Application filed September 13, 1924. Serial No. 737,497.

My invention relates to flexible elements, more particularly to flexible gear elements embodying flexible elements to permit relative movement of the rim member and its supporting hub.

It is among the objects of my invention to provide a flexible gear element embodying an improved spring element and which shall be of simple compact and durable mechanical construction.

Another object of my invention is to provide a flexible gear element of the above-designated character which shall have a relatively large amount of tangential deflection and which shall be laterally flexible to a very high degree.

Still another object of my invention is to provide a flexible gear in which the spring element is readily attachable and in which such spring member is not subject to mechanical wear or erosion.

In the prior types of flexible wheels, the spring elements were of the well known helical and leaf spring types which were engaged with the moving parts of the gear member and subject to considerable wear. To overcome this objection, various forms of wearing shoes or liners were devised and the construction, machining and assembling of the gear wheels were very much complicated thereby.

My present invention is directed to a flexible gear element in which the flexible members are attached to the moving parts in such manner that engaging surfaces are entirely eliminated, the spring coming in contact with the moving parts only where it is securely attached, thus leaving the remaining body portion free to deflect.

I utilize annular spring elements or segments thereof and secure their ends to the relatively movable parts which provides greater tangential flexure than is inherent in other types of spring elements. This type of spring and the manner of mounting also provides greater lateral flexibility which is particularly desirable in certain types of gear wheels where it is desired to obtain universal movement between the rim and supporting hub portions.

In the accompanying drawings constituting a part hereof and in which like reference characters designate like parts:

Figure 1 is a view in cross section of a flexible drive mechanism embodying the principles of my invention, taken along the line I—I of Fig. 2, Fig. 2 is a view, partially in side elevation and partially in section thereof taken along the line II—II of Fig. 1, and Fig. 3 is a view in cross section of a somewhat modified form of drive unit embodying my improved spring element.

Refering to Figs. 1 and 2, the device therein illustrated comprises a shaft or axle member 1 having a wheel center 2 secured by a press fit or in any other suitable manner on the end thereof and a flanged wheel 3 and a gear wheel 4 securely mounted on said center. The gear wheel 4 comprises a spherical hub portion 5 which is secured to the wheel center 2, a movable rim center 6 formed complementary to the shape of said hub, and an outer rim 7 provided with gear teeth 8 and secured to the rim center 6. The rim center 6 is provided with an axially projecting segmental spring lug 9 having brackets 10 and 11 formed integrally therewith or detachably secured at each end thereof.

Another lug 9a is formed integral with the wheel center 2 and also has the shape of an annular segment, of a radius equal to that of the lug 9. In their normal operating positions, the lugs 9 and 9a, taken together, constitute nearly a complete annulus, a sufficient clearance distance being provided between the adjacent ends thereof to allow relative angular movement of the gear center 6 and the wheel center 2. Brackets 10a and 11a are attached at the ends of the lug 9a in a manner similar to the mounting of the brackets 10 and 11 on the lug 9.

The brackets 10 and 10a lie in a plane perpendicular to the axis of the shaft 1, and the brackets 11 and 11a are disposed in a parallel plane slightly displaced axially from the plane of brackets 10 and 10a.

A spring element 12, having the shape of an annulus with a small section removed, is secured at its ends to the brackets 10 and 10a. respectively, and is positioned concentric to and outside of the lugs 9 and 9a. A second identical spring element 12a is secured in the same manner to the brackets 11 and 11a, and is disposed in parallel relation to the spring 12. The ends of the spring elements 12 and 12a may be fastened in the spring brackets by either a wedge 16, or by a weld deposit 17, or both.

The gear wheel 4 is provided with a gear case 13 which merely encloses the same for the purpose of preventing accessibility of foreign ingredients and also to retain the lubricant. The spherical seating portions of the hub 5 and the rim center 6 are lubricated by the communicating openings 14 while grooves 15 are provided in the engaging surfaces to provide adequate lubrication therefor. The lugs 9 and 9a are provided with projections 18 for limiting what may be termed the "winding up" movement of the springs 12 and 12a and spring stops 19 are provided to limit the "unwinding" movement of the spring elements.

The clearance spaces between the lugs 9 and 9a may be so arranged as to permit a limited stressing of the spring members whereby when they are subjected to overload, the lugs will be rigidly engaged and will be capable of carrying such loads.

In the modification shown in Fig. 3, laminated segmental springs 12 are secured in the spring brackets 20 which brackets are alternately secured to the lugs 9 and 9a projecting from the gear rim 6 and the wheel 3 respectively. In Fig. 3, are also shown vertical projecting lugs 21 mounted on the wheel center 2 and on the lug 9 which are adapted to engage to limit tangential deflection of the spring elements 12.

The operation of the drive mechanism is briefly as follows: The gear wheels 4 are mounted for universal movement upon the spherical seating portion 5 of the wheel center 2 and are limited in such movement by the spring elements 12 which have a greater deflection laterally than tangentially to readily permit alignment of the gear teeth 8 with the co-operating gear teeth of the driving member when the respective axes of the driving and driven shafts are out of alignment and the gear rim by virtue of the tangential deflection of the spring members is permitted to move angularly with load variations or as the result of impact and shock. The spring units are formed of laminations and are of such cross section that they will be relatively stiff in the direction of tangential deflection and of least resistance to lateral deflection, the latter being further reduced by the nature and mounting of the segmental annular springs.

Although I have shown the spring elements operatively engaged with a gear mounted for universal movement, it is evident that such spring elements may be applied to gear wheels that are restrained from lateral movement and that such spring elements may be connected to a pair of co-operating members to provide a flexible connection or coupling.

It is evident from the foregoing description of my invention that flexible gear elements or couplings made in accordance therewith provide a simple and inexpensive structure which is efficient in permitting deflections in predetermined directions for co-operating movable elements and that such spring construction eliminates the excessive amount of wear and breakage to which prior types of spring structures were subjected.

Although I have described a specific embodiment of my invention it will be obvious to those skilled in the art that various modifications may be made in the details of construction and the size and proportions of the several co-operating parts without departing from the principles herein set forth.

I claim as my invention:

1. A flexible element comprising a pair of complementary drive members having stops and a plurality of segmental springs secured at their ends to the respective drive members, said springs being adapted for engagement with the stops to limit the stress acting upon them.

2. A flexible element comprising a pair of complementary drive members having stops and a plurality of segmental springs of laminated construction, secured at their ends to the respective drive members, said springs being adapted for engagement with the stops to limit the stress acting upon them.

3. A flexible gear wheel comprising a hub, a rim mounted for universal movement thereon, a plurality of spring brackets secured to said hub and rim, segmental springs secured in said brackets, and means for limiting the relative movement of said hub and rim.

4. A flexible gear wheel comprising a hub, a rim mounted for universal movement thereon, a plurality of spring brackets secured to said hub and rim, segmental springs secured in said brackets, and stop lugs provided on said hub and rim to limit the relative movement thereof.

5. A flexible gear wheel comprising a hub, a rim mounted for universal movement thereon, a plurality of spring brackets secured to said hub and rim, segmental springs secured in said brackets, and stop lugs provided on said hub and rim to limit the tangential deflection of said springs.

6. A flexible drive comprising a hub, a gear rim mounted for universal movement thereon, a wheel secured to the other end of said hub in complementary relation to said gear wheel, a plurality of spring brackets secured to said wheels, segmental springs secured at their respective ends to the brackets of said rim and wheel to join the same, radial projecting lugs on said hub and gear rim to limit the tangential movement thereof and spring stops provided on said rim and said wheel to limit the tangential deflection of said springs.

7. A flexible drive comprising a hub, a gear rim mounted for universal movement thereon, a wheel secured to the other end of said hub in complementary relation to said gear wheel, a plurality of spring brackets secured to said wheels, laminated segmental springs secured at their respective ends to the brackets of said rim and said wheel to join the same, radial projecting lugs on said hub and gear rim to limit the tangential movement thereof and spring stops provided on said rim and wheel to limit the tangential deflection of said springs.

8. A flexible drive comprising a hub, a gear rim mounted for universal movement thereon, a wheel secured to the other end of said hub in complementary relation to said gear wheel, a plurality of spring brackets secured to said wheels, laminated segmental springs secured at their respective ends to the brackets of said rim and wheel to join the same, radial projecting lugs on said hub and gear rim to limit the tangential movement thereof and spring stops provided on said rim and wheel to limit the tangential deflection of said springs, means for resiliently restraining relative tangential movement of said rim and wheel and means for resiliently restraining lateral movement of said gear rim.

In testimony whereof, I have hereunto subscribed by name this 3rd day of September, 1924.

CLAUDE BETHEL.